(12) United States Patent
Uchida

(10) Patent No.: US 11,161,508 B2
(45) Date of Patent: Nov. 2, 2021

(54) DRIVING ASSIST METHOD, DRIVING ASSIST APPARATUS, AND DRIVING ASSIST SYSTEM

(71) Applicant: YAMAHA HATSUDOKI KABUSHIKI KAISHA, Iwata (JP)

(72) Inventor: Yoshiaki Uchida, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 0 days.

(21) Appl. No.: 15/435,868

(22) Filed: Feb. 17, 2017

(65) Prior Publication Data

US 2017/0158195 A1 Jun. 8, 2017

Related U.S. Application Data

(63) Continuation of application No. PCT/JP2015/071718, filed on Jul. 30, 2015.

(30) Foreign Application Priority Data

Aug. 21, 2014 (JP) .............................. JP2014-168660

(51) Int. Cl.
  *B60W 30/14* (2006.01)
  *B60W 30/18* (2012.01)
  (Continued)

(52) U.S. Cl.
  CPC .... *B60W 30/143* (2013.01); *B60W 30/18145* (2013.01); *B60W 40/072* (2013.01);
  (Continued)

(58) Field of Classification Search
  CPC ........... B60W 30/143; B60W 2720/10; B60W 2550/40; B60W 2550/146;
  (Continued)

(56) References Cited

U.S. PATENT DOCUMENTS 8,897,960 B2 * 11/2014 Sekine .................. B60W 50/14
  340/988
9,061,590 B2 * 6/2015 Kurumisawa .......... B60K 31/00
  (Continued)

FOREIGN PATENT DOCUMENTS

EP  1 677 272 A1  7/2006
EP  1 679 673 A1  7/2006
  (Continued)

OTHER PUBLICATIONS

Official Communication issued in International Patent Application No. PCT/JP2015/071718, dated Oct. 20, 2015.

*Primary Examiner* — Mathew Franklin Gordon
(74) *Attorney, Agent, or Firm* — Keating and Bennett, LLP

(57) ABSTRACT

A driving assist method includes detecting positional information of a first vehicle, storing the detected positional information, detecting a curve along which the first vehicle travels in accordance with the stored positional information, generating curve information including a curvature of the curve at the detected curve, transmitting the generated curve information from the first vehicle after the vehicle passes the curve, receiving the curve information by a second vehicle, determining a timing to provide the curve information in accordance with the received curve information, and providing the curve information at the determined timing.

11 Claims, 9 Drawing Sheets

(51) Int. Cl.

| | |
|---|---|
| *B60W 40/072* | (2012.01) |
| *B60W 50/12* | (2012.01) |
| *G08G 1/09* | (2006.01) |
| *G01C 21/26* | (2006.01) |
| *B62J 27/00* | (2020.01) |
| *B62J 45/40* | (2020.01) |
| *B62J 45/415* | (2020.01) |
| *B62J 50/20* | (2020.01) |

(52) U.S. Cl.
CPC .............. *B60W 50/12* (2013.01); *B62J 27/00* (2013.01); *G01C 21/26* (2013.01); *G08G 1/09* (2013.01); *B60W 2300/36* (2013.01); *B60W 2420/42* (2013.01); *B60W 2520/06* (2013.01); *B60W 2520/10* (2013.01); *B60W 2520/14* (2013.01); *B60W 2552/30* (2020.02); *B60W 2556/45* (2020.02); *B60W 2720/10* (2013.01); *B62J 45/40* (2020.02); *B62J 45/4151* (2020.02); *B62J 50/20* (2020.02)

(58) Field of Classification Search
CPC ......... B60W 2520/14; B60W 2520/10; B60W 2520/06; B60W 2300/36; B60W 50/12; B60W 40/072; B60W 30/18145; B60W 2420/42

See application file for complete search history.

(56) References Cited

U.S. PATENT DOCUMENTS

| | | | | |
|---|---|---|---|---|
| 9,139,204 | B1* | 9/2015 | Zhao | .................... G01C 21/00 |
| 2006/0261980 | A1* | 11/2006 | Beier | .................... G01C 21/26 |
| | | | | 340/988 |
| 2011/0301802 | A1* | 12/2011 | Rupp | ................... G08G 1/0112 |
| | | | | 701/408 |
| 2014/0207307 | A1* | 7/2014 | Jonsson | ................ B60W 50/14 |
| | | | | 701/1 |
| 2014/0257686 | A1* | 9/2014 | Feldman | ................ G06F 17/00 |
| | | | | 701/300 |
| 2015/0354968 | A1* | 12/2015 | Mizuno | .................. G01C 21/32 |
| | | | | 701/534 |

FOREIGN PATENT DOCUMENTS

| | | |
|---|---|---|
| JP | 2006-024104 A | 1/2006 |
| JP | 2009-069938 A | 4/2009 |
| JP | 4318314 B2 | 8/2009 |
| JP | 2013-242727 A | 12/2013 |

* cited by examiner

DRIVING ASSIST METHOD, DRIVING ASSIST APPARATUS, AND DRIVING ASSIST SYSTEM

CROSS REFERENCE TO RELATED APPLICATIONS

This application claims the benefit of priority to Japanese Patent Application No. 2014-168660 filed on Aug. 21, 2014 and is a Continuation application of PCT Application No. PCT/JP2015/071718 filed on Jul. 30, 2015. The entire contents of each application are hereby incorporated herein by reference.

BACKGROUND OF THE INVENTION

1. Field of the Invention

The present invention relates to a driving assist method, a driving assist apparatus, and a driving assist system. More particularly, the present invention is directed to a method and a device that transmits and receives information among vehicles.

2. Description of the Related Art

A vehicle whose body is able to lean (hereinafter, referred to as a leaning type vehicle) when traveling along or through curves. Accordingly, information on the curves is especially helpful for a driver who drives the leaning type vehicle. Accordingly, Japanese Patent No. 4318314 B discloses a driving assist system to assist traveling of the leaning type vehicle.

Japanese Patent No. 4318314 B provides a two-wheeled motor vehicle that stores information on the maximum lean angle and the maximum vehicle speed set in accordance with curvatures of the curves. Also provided is a traveling assistance to review the driver's own driving by calculating a lean angle of a vehicle body from a vehicle speed and a yaw rate when the two-wheeled motor vehicle actually travels along a curve and by informing the driver of a comparison result between the calculated lean angle and a predetermined lean angle.

However, the presently used configuration described above possesses the following drawback. Specifically, the curve information obtained from a single vehicle is only confirmed from the vehicle itself. Accordingly, the information is not able to be shared among drivers who drive other vehicles. In addition, when a driver drives a vehicle with no navigation system, the driver drives the vehicle without any background knowledge concerning the curves since no map information is provided. In such a case, traveling along the curve under a suitable condition depends on the driver's skill, leading to considerable mental stress to the driver.

Moreover, even with a navigation system, the condition of the curve where the vehicle enters is unclear when the map information includes no curve information. Furthermore, even when the map information includes some curve information, important current curve information is not obtainable when the map information is not updated. Consequently, the driver drives the vehicle along a curve for the first time anxiously since the condition of the curve is unclear. This increases the driver's mental stress.

SUMMARY OF THE INVENTION

Preferred embodiments of the present invention provide a driving assist method, a driving assist apparatus, and a driving assist system each allowing the sharing of curve information, obtained by a driver through actual traveling of a vehicle, with a driver of another vehicle.

A preferred embodiment of the present invention provides a driving assist method. The driving assist method includes a positional information detecting step of detecting positional information of a first vehicle, a positional information storing step of storing the detected positional information, a curve detecting step of detecting a curve along which the first vehicle travels in accordance with the stored positional information, a curve information generating step of generating curve information including a curvature of the curve at the detected curve, a transmitting step of transmitting the generated curve information from the first vehicle after the first vehicle passes the curve, a receiving step of receiving the curve information by a second vehicle, a timing determining step of determining a timing to provide the curve information in accordance with the received curve information, and an information providing step of providing the curve information at the determined timing.

With the driving assist method according to a preferred embodiment of the present invention, traveling positions of the first vehicle are stored, and a curve along which the first vehicle travels is detected. The curve information of the detected curve including the curvature of the curves is transmitted after the first vehicle passes the curve. Accordingly, the driver of the second vehicle approaching a target curve is able to be assisted when traveling along the curve. Consequently, the exchange of the information with the oncoming vehicle after traveling along the curve provides driver assistance with less influence from electromagnetic waves and the like.

In addition, a timing to provide the curve information is determined in accordance with the information of the curve where the second vehicle is going to travel. As a result, the curve information is confirmed at a suitable timing before the second vehicle enters the curve. Consequently, the curve information is able to be confirmed before the second vehicle enters a curve even when the curve is traveled for the first time, leading to a decrease in the driver's stress.

Moreover, a preferred embodiment of the method further includes an entering speed determining step of determining a curve entering speed in accordance with the curvature of the curve included in the curve information, and the timing determining step determines the timing in accordance with the curve information and the speed of the second vehicle, and the information providing step provides the curve entering speed in accordance with the timing. The curve entering speed of the second vehicle that receives the curve information is determined in accordance with the curve information including the curvature of the curve. This provides a suitable entering speed relative to the curve, leading to driving assistance during the curve. In addition, since the timing to provide the curve information is determined in accordance with the speed of the second vehicle that is going to travel along the curve, the driver is able to confirm the curve information at a suitable timing before the second vehicle enters the curve.

In addition, a preferred embodiment of the method further includes a speed comparing step of comparing the speed of the second vehicle with the curve entering speed, and a deceleration starting position calculating step of calculating a deceleration starting position in accordance with a position of the second vehicle and the curve information when the speed of the second vehicle is larger than the curve entering speed, and that the information providing step includes providing deceleration instructing information when the second vehicle reaches the deceleration starting position.

Moreover, the above method preferably includes an entering speed correcting step of correcting the determined curve entering speed in accordance with road information included in the curve information. The curve entering speed is corrected in accordance with the road information, such that an optimal curve entering speed is provided depending on the road conditions. The road conditions are only able to be detected by the driver's own vehicle at a distance close to the vehicle, and thus are often insufficient for timely providing information to the driver. Here, the road information is obtained from other vehicles, thus providing the information at a suitable timing.

Moreover, a preferred embodiment of the method further includes an evaluating step of evaluating whether or not the second vehicle travels along the curve in response to the received curve information. The curve information from the first vehicle is transmitted to all vehicles traveling therearound. Accordingly, an evaluation of whether or not the second vehicle travels along the target curve prevents providing the curve information that is unnecessary for the driver.

Another preferred embodiment of the present invention provides a vehicle driving assist apparatus. The vehicle driving assist apparatus includes a positional information detector that detects positional information of a transmitting vehicle, a positional information storage that stores the detected positional information, a curve detector that detects a curve along which the transmitting vehicle travels in accordance with the stored positional information, a curve information generator that generates curve information on the detected curve, and a transmitter that transmits the generated curve information, wherein the curve information includes a curvature of the curve.

The above apparatus stores a traveling position of the transmitting vehicle and detects a curve where the transmitting vehicle travels. The curve information including at least the curvature of the detected curve is transmitted such that driving assistance is obtained for another vehicle traveling along the curve.

Moreover, it is preferred that the curve information also includes road information. The road information is included in the curve information. Accordingly, more helpful curve information is transmitted in response to the road conditions.

Moreover, the vehicle driving assist apparatus according to another preferred embodiment of the present invention includes a receiver that receives the curve information including the curvature of the curve, a timing calculator that determines a timing to provide the curve information in accordance with the received curve information, and an information output that provides the curve information at the determined timing.

Here, the timing to provide the curve information is determined in accordance with the information of the curve where the receiving vehicle is going to travel. Accordingly, the curve information is confirmed at a suitable timing before the vehicle enters the curve.

Moreover, it is preferred that the above apparatus further includes an entering speed calculator that determines a curve entering speed in accordance with the curvature of the curve included in the curve information, and that the timing calculator determines the timing in accordance with the curve information and the speed of the receiving vehicle, and the information output provides the curve entering speed at the time. Since the curve entering speed is determined in accordance with the curve information including the curvature of the curve, a suitable entering speed relative to the curve is provided. This provides assistance to the receiving vehicle traveling along the curve. In addition, the timing to provide the curve information is determined in accordance with the speed of the receiving vehicle that is going to travel along the curve. Consequently, the driver is able to confirm the curve information at a more suitable timing before the receiving vehicle enters the curve.

Moreover, it is preferred that the above apparatus further includes an entering speed corrector that corrects the determined curve entering speed in accordance with the road information included in the curve information. The curve entering speed is corrected in accordance with the road information, such that an optimal curve entering speed is provided depending on the road conditions. The road conditions are only detected by the driver's own vehicle at a distance close to the driver's vehicle, and thus is often insufficient information to assist the driver. Here, the road information is obtained from another vehicle, thus providing the information at a suitable timing.

Moreover, it is preferred that the above apparatus further includes a speed comparator that compares the speed of the receiving vehicle with the curve entering speed, and a deceleration starting position calculator that calculates a deceleration starting position in accordance with a position of the receiving vehicle, and the curve information when the speed of the receiving vehicle is larger than the curve entering speed. It is also preferred that the information output provides deceleration instructing information when the receiving vehicle enters the deceleration starting position.

Moreover, it is preferred that the above apparatus further includes an evaluator that evaluates whether or not the receiving vehicle travels along the curve in response to the received curve information. The curve information from the transmitting vehicle is transmitted to all vehicles traveling therearound. Accordingly, evaluation of whether or not the receiving vehicle travels along the target curve reduces or prevents providing curve information that is unnecessary for the driver.

Another preferred embodiment of the present invention provides a driving assist system including the driving assist apparatus described above. With the driving assist system according to another preferred embodiment of the present invention, driving assistance for the vehicle is obtained using the driving assist apparatus that provides the curve information through vehicle-to-vehicle communication and the driving assist apparatus that receives the curve information.

It is preferred that the driving assist system further includes a server that stores the transmitted curve information, and the server transmits the stored curve information to the driving assist apparatus of the receiving vehicle. Transmitting the information via the server allows the receiving vehicles to receive the curve information even when there is a time interval between when the transmitting vehicle that has traveled along curve transmits the curve information and the receiving vehicle travels along the curve.

Moreover, it is preferred that the server acquires positional information of the transmitting and receiving vehicles, and transmits the stored curve information to the driving assist apparatus of the receiving vehicle traveling toward the curve in response to the curve information. The server also acquires the positional information on every vehicle. Accordingly, the receiving vehicle that travels toward the curve in response to the stored curve information is able to be identified. Consequently, the server is able to transmit the curve information to the receiving vehicle.

The preferred embodiments of the present invention provide a driving assist method, a driving assist apparatus, and a driving assist system that allow the sharing of curve information obtained through actual travel of a vehicle with drivers of other vehicles.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

First Preferred Embodiment

The following describes preferred embodiments of the present invention with reference to drawings. Here, a two-wheeled motor vehicle of the leaning type is to be described as one non-limiting example of a vehicle. The following describes terms forward/backward and right/left based on a traveling direction of the two-wheeled motor vehicle.

Figure 1:
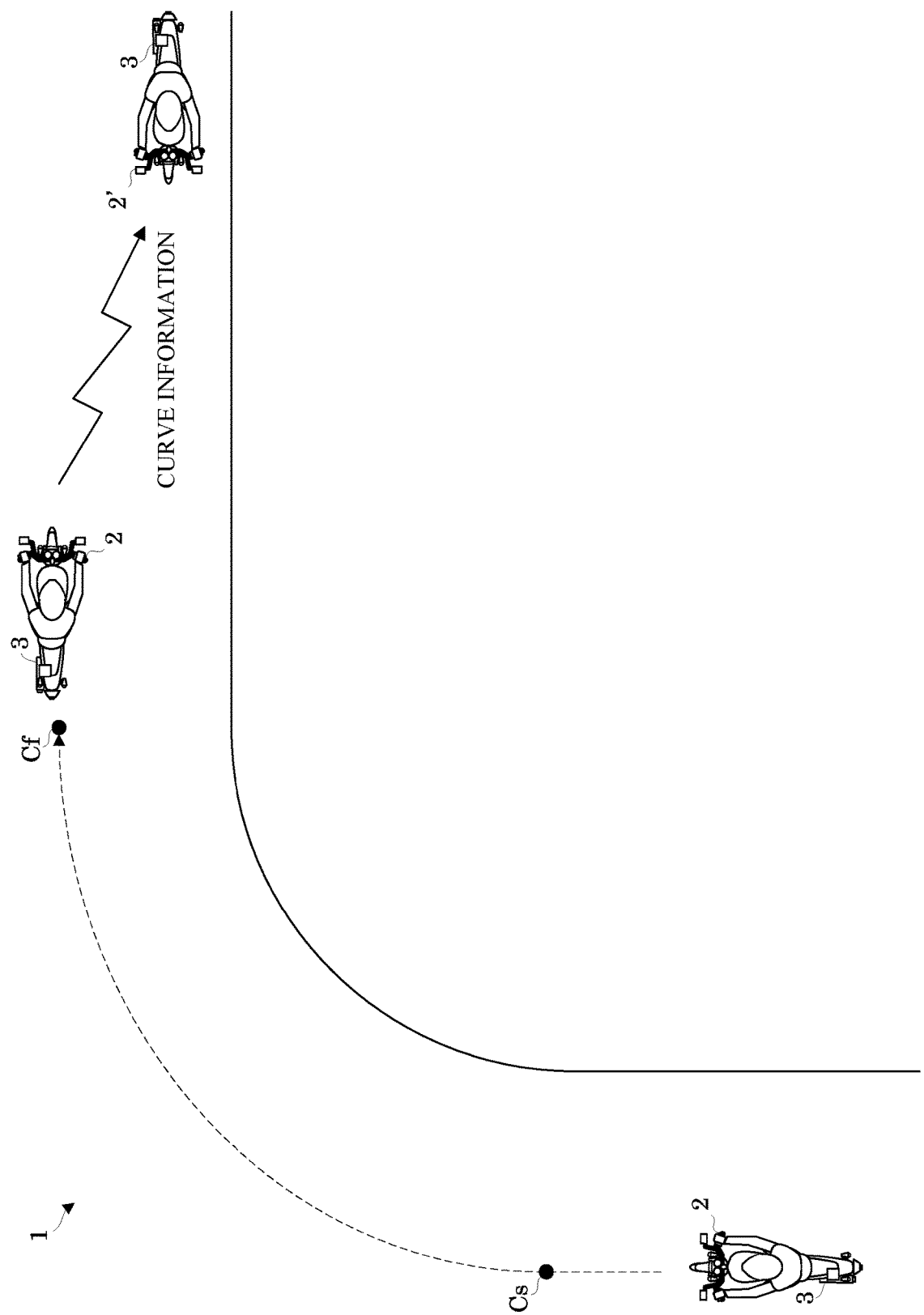
FIG. 1 illustrates an outline configuration of a driving assist system according to a first preferred embodiment of the present invention.

FIG. 1 illustrates a driving assist system according to the present preferred embodiment. A driving assist system 1 collects information about a curve while a first vehicle 2 travels along the curve, generates curve information in accordance with the information on the curve, and transmits the curve information to the surroundings. A second vehicle 2' approaching the curve and including the system receives the curve information and provides the curve information to a driver of the second vehicle 2' at a suitable timing. The driving assist system 1 includes a plurality of driving assist apparatuses 3 installed in each of the first vehicle 2 and the second vehicle 2'.

Figure 2:
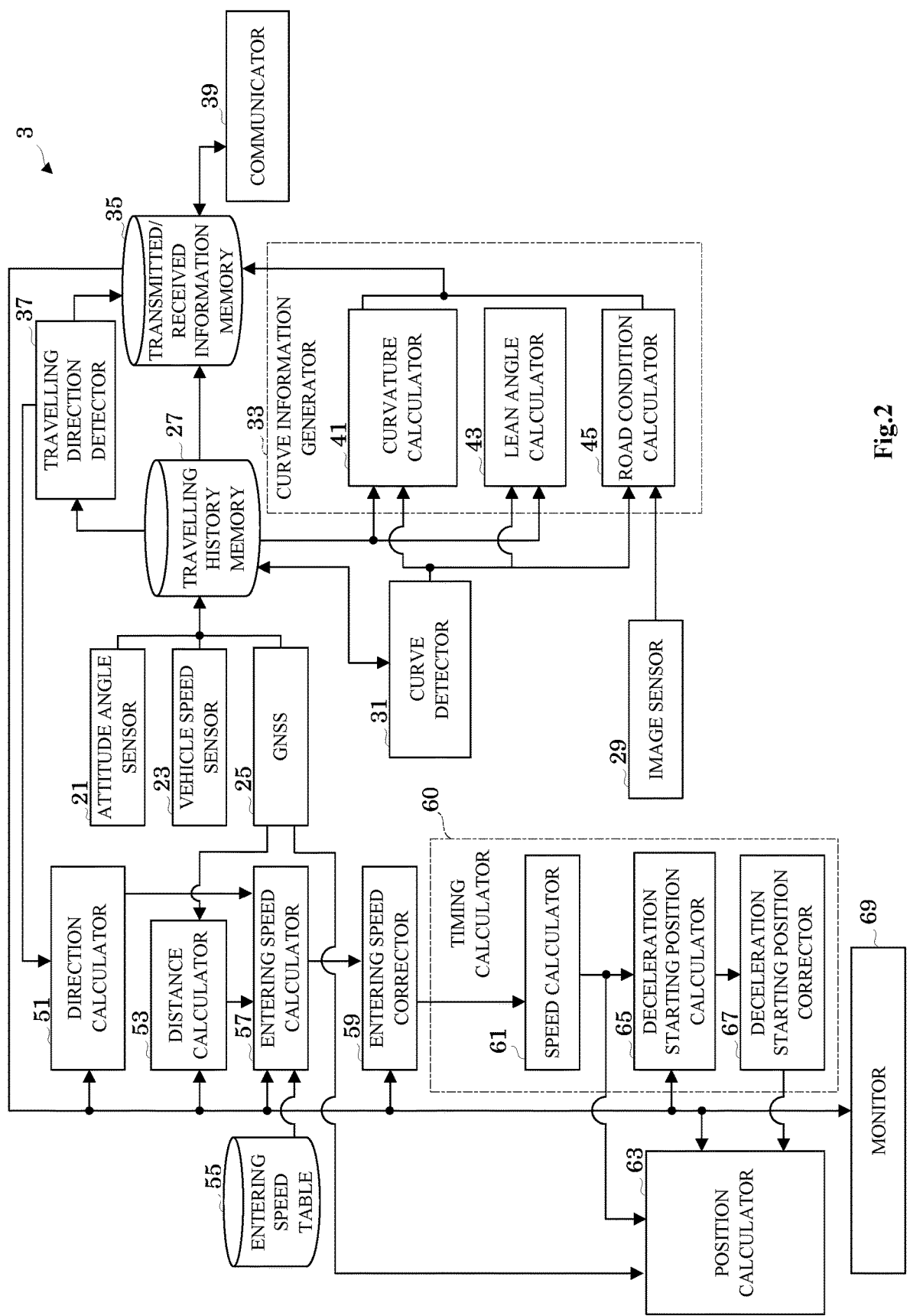
FIGS. 2 and 3 are each a block diagram of the driving assist apparatus according to the first preferred embodiment of the present invention.
Figure 3:
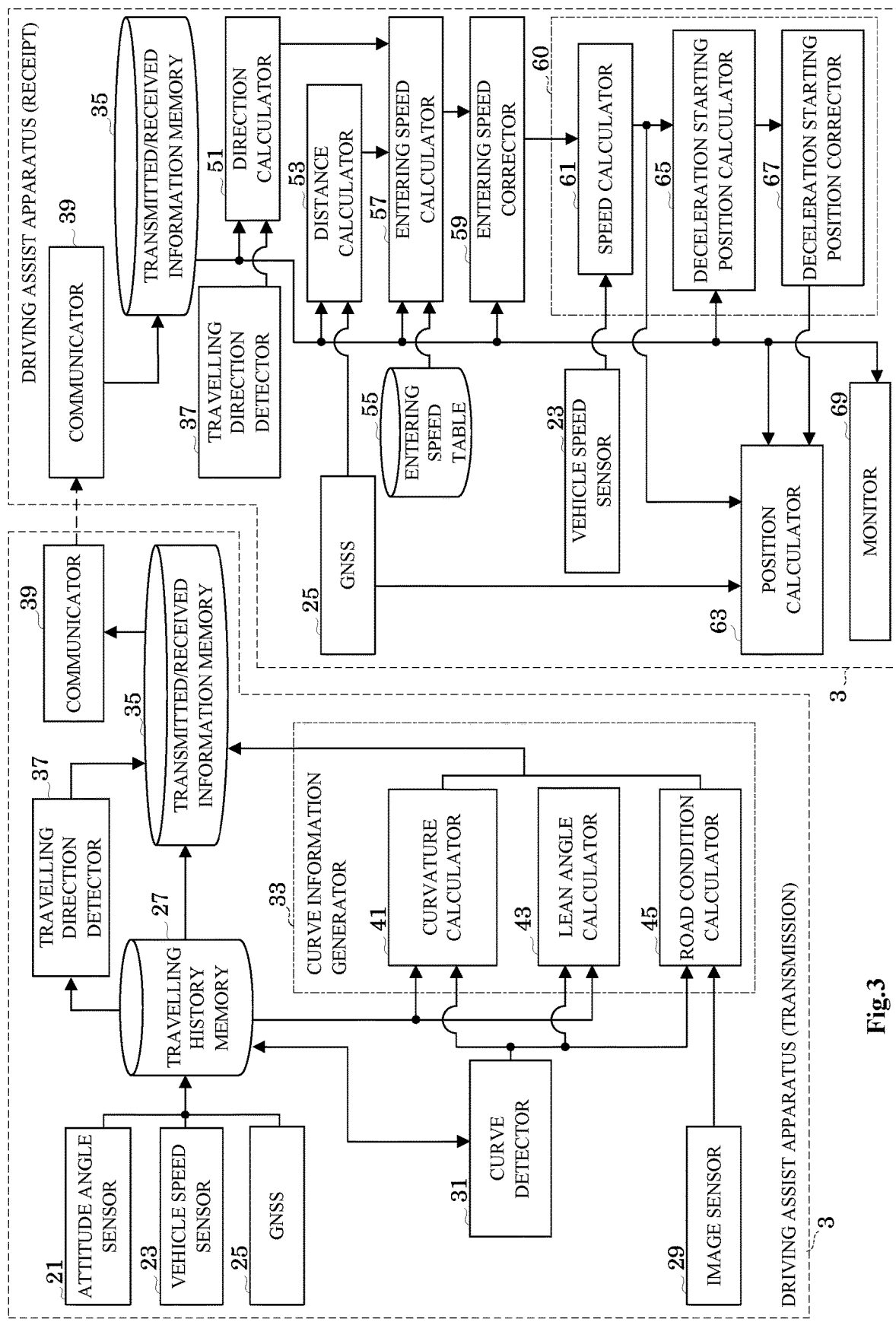

The following describes a configuration of the driving assist apparatus with reference to FIGS. 2 and 3. FIG. 2 is a block diagram illustrating the configuration of the driving assist apparatus. FIG. 3 illustrates a main configuration of the driving assist apparatus used to generate and provide curve information and a main configuration of receiving and guiding the curve information.

A driving assist apparatus 3 includes an attitude angle sensor 21, a vehicle speed sensor 23, a GNSS (Global Navigation Satellite System) 25, a traveling history memory 27, an image sensor 29, a curve detector 31, a curve information generator 33, a transmitted/received information memory 35, a traveling direction detector 37, and a communicator 39. These elements are used to generate and transmit the curve information.

The attitude angle sensor 21 detects an attitude angle of the first and second vehicle 2, 2'. A non-limiting example of the attitude angle sensor 21 is a gyroscope. When a driver leans a vehicle body of the first and second vehicle 2, 2' toward the center of the curve upon traveling in the curve, a yaw angle and a yaw rate as well as a roll angle and a roll rate of the first and second vehicle 2, 2' vary. The attitude angle sensor 21 detects an angular velocity and an angle of the first and second vehicle 2, 2' in each of three directions, i.e., yaw, roll, and pitch directions. That is, a yaw rate, a yaw angle, a roll rate, a roll angle, a pitch rate, and a pitch angle of the first and the second vehicle 2, 2' are detected. These detected values of the attitude angle are stored in the traveling history memory 27.

The vehicle speed sensor 23 detects a traveling speed of the first and second vehicle 2, 2'. The vehicle speed sensor 23 may include a wheel speed sensor to detect the vehicle speed from a rotation speed of a wheel. Alternatively, the vehicle speed sensor 23 may detect the vehicle speed from tracking by the GNSS 25. The detected vehicle speed is stored in the traveling history memory 27.

The GNSS 25 detects positional information of the first and second vehicle 2, 2' and current time. A non-limiting example of the GNSS is a GPS. The detected positional information and time information are stored in the traveling history memory 27 as a traveling history associated with the detected attitude angle and the traveling speed. The GNSS 25 corresponds to the positional information detector. Positional information with a higher accuracy is also obtainable through the GNSS 25 and the attitude angle sensor 21.

The traveling history memory 27 stores the traveling history of the first and second vehicle 2, 2'. Examples of the stored traveling history include, in addition to the traveling position and a traveling time, the attitude angle and the vehicle speed of the first and second vehicle 2, 2'.

The image sensor 29 takes an image of a road surface in front of the first vehicle 2. The captured image is outputted to a road condition calculator 45 of the curve information generator 33. For instance, a CCD camera or a CMOS sensor is preferably used as the image sensor 29.

The curve detector 31 detects a curve where the first vehicle 2 travels in accordance with the traveling history. That is, a start position Cs and a terminal position Cf of the curve as well as a traveling start time and a traveling terminal time relative to the curve are detected. The curve detector 31 allows determination of entering the curve and traveling away from the curve in accordance with a history of the positional information or a history of the roll rate stored in the traveling history memory 27. When detecting the start of traveling of the first vehicle 2 along the curve, the curve detector 31 issues a command to the curve information generator 33 to generate curve information.

The curve information generator 33 generates curve information on the detected curve. The curve information generator 33 includes a curvature calculator 41, a lean angle calculator 43, and a road condition calculator 45. The curve information generator 33 captures various detected values from the traveling history memory 27 through commands from the curve detector 31.

The curvature calculator 41 calculates a curvature of the curve where the first vehicle 2 travels. The curvature of the curve is able to be calculated with a high accuracy by integrating the roll angle with the vehicle speed between the curve starting position and the curve terminal position. The curvature calculator 41 outputs the calculated curvature of the curve to the transmitted/received information memory 35.

The lean angle calculator 43 calculates a lean angle of the two-wheeled motor vehicle 1 during traveling. The lean angle (banking angle) is able to be calculated from the vehicle speed and the yaw rate with use of the method described in Japanese Patent No. 4318314 B, for example. The lean angle calculator 43 outputs the maximum lean angle among the lean angles calculated during traveling along the curve to the transmitted/received information memory 35.

The road condition calculator 45 determines the road condition through image processing in accordance with an image of the road surface taken by the image sensor 29 during traveling along the curve. It is determined whether the road is a paved road or a dirt road, and also determined under which condition the road is, a dry condition, a wet condition, or a snow condition, for example. The road condition calculator 45 outputs the determined road information to the transmitted/received information memory 35.

The traveling direction detector 37 detects a direction where the first and second vehicle 2, 2' travels in accordance with the traveling history of positional information stored in the traveling history memory 27. For instance, the traveling direction of the first and second vehicle 2, 2' is detected under the assumption that a north direction corresponds to 0 degrees, an east direction corresponds to 90 degrees, a south direction corresponds to 180 degrees, and a west direction corresponds to 270 degrees. The traveling direction detector 37 detects a traveling direction periodically every predetermined time. The traveling direction detector 37 outputs an average of the traveling direction detected after completion of traveling along the curve, to the transmitted/received information memory 35.

The transmitted/received information memory 35 stores communication information with the other vehicle. The stored curve information includes a curvature of the curve where the first vehicle 2 travels, positional information on the curve terminal, the road information, a traveling time of traveling at the curve terminal position, and a traveling direction of the first vehicle 2 traveling along the curve.

The communicator 39 is a transmitting/receiving device that communicates with the other vehicle. The communicator 39 periodically transmits the curve information stored in the transmitted/received information memory 35 to the surroundings through radio communication for a predetermined time period or at a predetermined distance from the curve terminal position. For instance, the communicator 39 transmits the curve information to the surroundings every 100 msec., for example. In addition, the communicator 39 constantly receives the curve information from other vehicles.

The driving assist apparatus 3 further includes a direction calculator 51, a distance calculator 53, an entering speed table 55, an entering speed calculator 57, an entering speed corrector 59, a timing calculator 60, a position calculator 63, and a monitor 69. These elements are used to receive and process the curve information.

Figure 4:
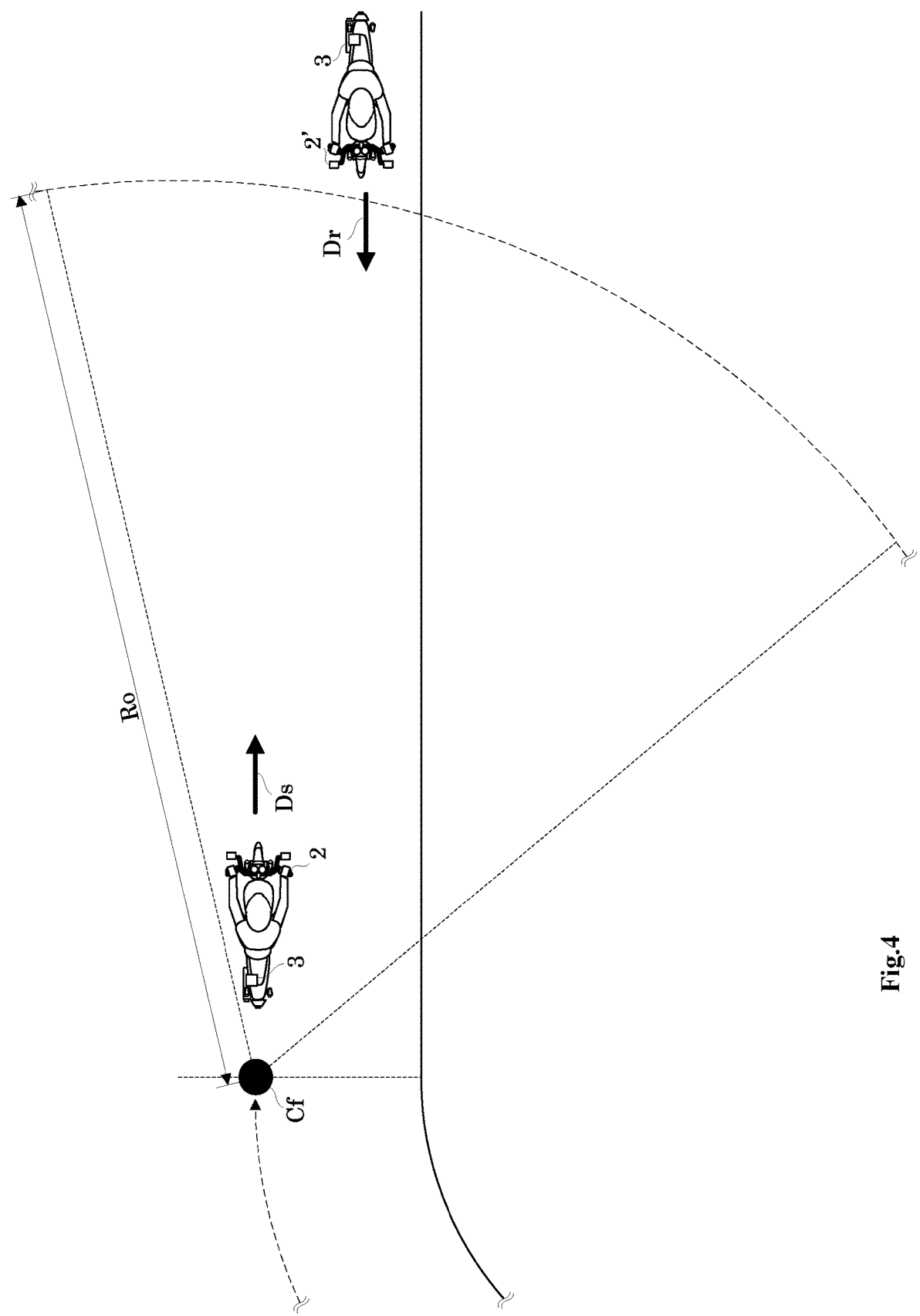
FIGS. 4 and 5 each illustrate determination of a traveling direction of a vehicle that receives curve information according to the first preferred embodiment of the present invention.
Figure 5:
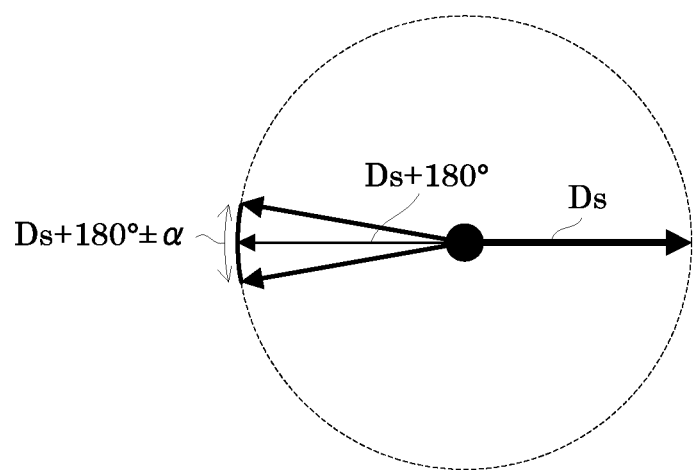

The direction calculator 51 determines whether or not the second vehicle 2' having received the curve information travels along the curve with reference to the direction. Reference is made to FIGS. 4 and 5. FIGS. 4 and 5 each illustrate a determination about the traveling direction of the vehicle that receives the curve information. For instance, it is determined whether or not a traveling direction Dr of the second vehicle 2' having received the curve information is an opposite direction relative to a traveling direction Ds of the first vehicle 2 having transmitted the curve information. Here, the opposite direction corresponds to a direction in an area obtained by adding 180 degrees to the traveling direction Ds of the vehicle 2 having transmitted the curve information and a tolerance a. Here, the tolerance a is about ±10 degrees, for example, but may be set as appropriate.

The distance calculator 53 determines whether or not the second vehicle 2' having received the curve information travels along the curve with reference to the distance. For instance, the above is determined from whether or not a distance between the curve terminal position Cf included in the curve information and the position of the second vehicle 2' having received the curve information is within a predetermined range. The predetermined range may be any radius distance Ro with the curve terminal position Cf as its center. Moreover, the predetermined range may be any radius distance Ro with a position of the first vehicle 2 having transmitted the curve information.

In the first preferred embodiment, it is determined that the second vehicle 2' having received the curve information travels toward the curve only when the direction calculator 51 determines that the second vehicles 2' travels toward the curve and only when the distance calculator 53 determines that the second vehicle 2' is located within the predetermined range from the curve. Otherwise, any combination of the map information of a car navigation system and direction and distance determination as described above may be used to determine whether or not the second vehicle 2' having received the curve information travels toward the curve.

Reference is made to FIGS. 2 and 3. The entering speed table 55 stores tables in association with suitable entering speeds for various curvatures of the curves. The suitable entering speeds are preferably each set through pre-determinations by a test rider.

The entering speed calculator 57 determines a suitable speed to enter the curve in accordance with the curve information. The entering speed calculator 57 determines an entering speed suitable for the curve included in the received curve information with reference to the entering speed table 55 when both the direction calculator 51 and the distance calculator 53 issue an instruction to determine an entering speed. The entering speed calculator 57 outputs the determined entering speed to the speed corrector 59.

The entering speed corrector 59 corrects the determined entering speed with reference to the road information included in the curve information. When the road information indicates dry pavement, which is a reference state, the determined entering speed is not corrected. On the other hand, when the road information indicates a wet or snow covered pavement, the entering speed is corrected to be decreased by a predetermined rate. Moreover, when the road information indicates a dirt road, the entering speed is uniformly corrected to be decreased, and when the road information indicates a wet or snow covered dirt road, the entering speed is uniformly corrected to be decreased and additionally corrected to be decreased by a predetermined rate. The corrected entering speed or the uncorrected entering speed is outputted to a speed calculator 61 of the timing calculator 60.

The timing calculator 60 determines a timing to provide the curve information to the driver in accordance with the curve information and the vehicle speed of the second vehicle 2'. The timing calculator 60 includes the speed calculator 61, a deceleration starting position calculator 65, and a deceleration starting position corrector 67.

The speed calculator 61 compares an inputted entering speed with the vehicle speed of the second vehicle 2' detected by the vehicle speed sensor 23 to determine whether or not the vehicle speed is larger than the entering speed. When the vehicle speed is larger than the entering speed, an instruction is provided to the deceleration starting position calculator 65 to calculate a deceleration starting position. When the vehicle speed is smaller than the entering speed, the timing calculator 60 issues an instruction to the position calculator 63 to determine whether or not the second vehicle 2' has already reached a predetermined position from the curve terminal position Cf. A time when the second vehicle 2' has reached the predetermined position corresponds to a timing to provide the curve information. Such a predetermined position as a guide position of the curve information is variable in accordance with the road information. That is, in the case of a dirt, wet, or snowy road condition, the curve information is provided at a timing when the vehicle is in a position farther away from the curve terminal position Cf than that in the case of dry pavement.

When the vehicle speed of the second vehicle 2' is larger than the entering speed, the deceleration starting position calculator 65 calculates a deceleration starting position of the second vehicle 2' in accordance with the position of the second vehicle 2' and the curve information. In other words, a deceleration section from when deceleration of the current vehicle speed of the second vehicle 2' is started until when the vehicle enters the curve terminal position at the entering speed is calculated.

The deceleration starting position corrector 67 corrects the calculated deceleration starting position in accordance with the road condition. The position calculator 63 receives the corrected deceleration starting position. That is, the deceleration starting position in the case of a dirt, wet, or snowy road is located farther away from the curve terminal position Cf than the deceleration starting position in the case of dry pavement.

The position calculator 63 determines whether or not the position of the second vehicle 2' is located in an area a predetermined distance from the curve position through comparison of the curve position included in the curve information, e.g., the curve terminal position Cf, with a current position of the second vehicle 2' detected with the GNSS 25 when the vehicle speed is equal to or smaller than the entering speed. When it is determined that the second vehicle 2' is located within an area the predetermined distance from the curve position, an instruction to provide the curve entering speed and the curve information is issued to the monitor 69.

The position calculator 63 also determines whether or not the position of the second vehicle 2' is closer to the curve than the deceleration starting position through comparison of the inputted deceleration starting position and the current position of the second vehicle 2' detected with the GNSS 25. When it is determined that the second vehicle 2' has reached the deceleration starting position, an instruction to provide the deceleration, the curve entering speed, and the curve information is issued to the monitor 69. In such a case, a time when the second vehicle 2' reaches the deceleration starting position corresponds to a timing to provide the curve information to the driver.

The monitor 69 is preferably a display that displays various pieces of information. In addition, the monitor 69 may include a touch panel that functions as an input to input various instructions from the driver. Moreover, the monitor 69 may include a speaker to provide voice guidance to the driver. The monitor 69 provides the curve information and the deceleration to the driver. The monitor 69 corresponds to the information output. Instead of the monitor 69, the curve information may be provided using an LED sign. The monitor 69 displays the curve information such as the curvature of the curve, a right or left curve direction, a curve shape, the maximum lean angle, the entering speed to the curve, and the road information. Moreover, the voice guidance may be provided from a speaker in the helmet instead of a speaker in the monitor 69.

Figure 6:
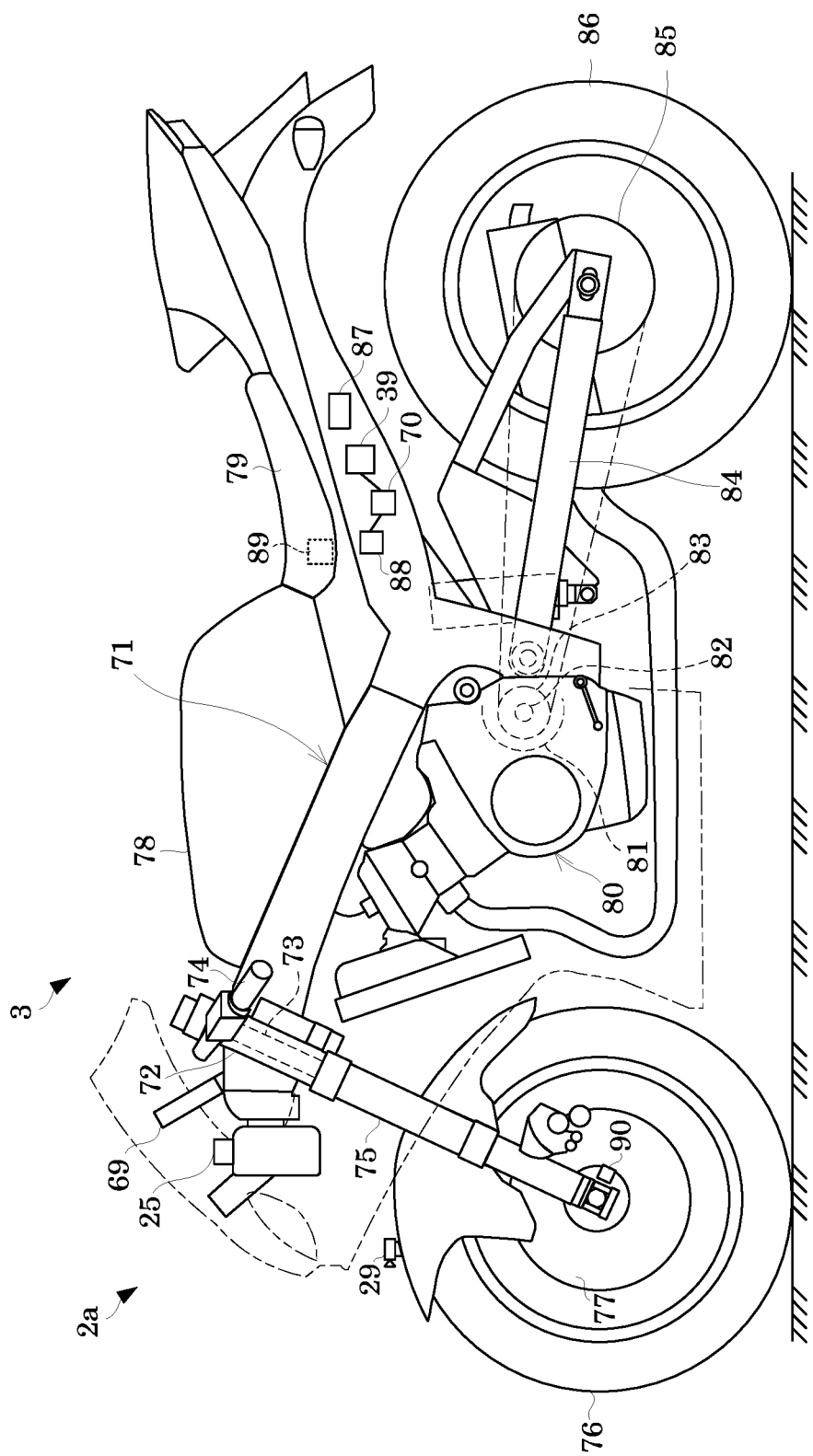
FIG. 6 schematically illustrates a side view of one example of the vehicle according to the first preferred embodiment of the present invention.

FIG. 6 illustrates a side view of a two-wheeled motor vehicle 2a with the driving assist apparatus 3 of the first preferred embodiment. The two-wheeled motor vehicle 2a includes a main frame 71. The main frame 71 includes a head tube 72 provided on a front upper end thereof. A steering shaft 73 is inserted into the head tube 72. The steering shaft 73 includes an upper end to which a handle 74 is connected.

The steering shaft 73 includes a lower end to which a pair of extendible and contractible front forks 75 is connected. Accordingly, rotation of the handle 74 causes the front forks 75 to swing. The front forks 75 each include a lower end to which a front wheel 76 is rotatably attached. Extension and contraction of the front forks 75 absorbs vibration from the front wheel 76. Moreover, a brake 77 is attached to each of the lower ends of the front forks 75 to brake rotation of the front wheel 76 via operation of a brake lever (not shown).

A fuel tank 78 and a seat 79 are disposed on an upper side of the main frame 71 in a front-to-back direction. An engine 80 and a transmission 81 are disposed on the main frame 2 below the fuel tank 78. The transmission 81 includes a drive shaft 82 that outputs power generated in the engine 80. The drive shaft 82 is connected to a drive sprocket 83.

A swing arm 84 is swingably disposed at a lower end of the main frame 71. A driven sprocket 85 and a rear wheel 86 are rotatably provided on a rear end of the swing arm 84. An ECU (Electronic Control Unit) 87 that controls operations of the elements of the two-wheeled motor vehicle 2a is disposed below the seat 79. The two-wheeled motor vehicle 2a additionally includes a monitor 69, which may include a liquid crystal display of a touch panel type. The monitor 69 is disposed on a front side of the handle 74, and displays various items of information, such as road information.

The two-wheeled motor vehicle 2a includes various sensors that detect vehicle conditions. A gyroscope 89, which functions as a vehicle attitude angle sensor 21, is disposed on the lower side of the seat 79. The gyroscope 89 detects angular speeds and angles in triaxial directions of yaw, roll, and pitch of the two-wheeled motor vehicle 2a. A wheel speed sensor 90, which functions as the vehicle speed sensor 23, detects a rotation speed of the front wheel 76, and calculates a vehicle speed of the two-wheeled motor vehicle 2a in accordance with the rotation speed. The detection values of various sensors are outputted to the traveling history memory 27. The GNSS 25 and the image sensor 29 are disposed on a forward portion of the two-wheeled motor vehicle 2a. The GNSS 25 receives through radio communication the traveling position of the vehicle, i.e., the position information of the vehicle in latitude/longitude, and the traveling time. The image sensor 29 captures images of a road surface in front of the two-wheeled motor vehicle 2a.

The communicator 39 transmits and receives the curve information. A radio communicator may be used as the communicator 39. Moreover, the two-wheeled motor vehicle 2a includes a microprocessor 88 that is configured or programmed to function as the curve detector 31, the curve information generator 33, the traveling direction detector 37, the direction calculator 51, the distance calculator 53, the entering speed calculator 57, the entering speed corrector 59, the timing calculator 60, and the position calculator 63, all provided on one chip. The two-wheeled motor vehicle 2a further includes a memory 70 that includes the traveling history memory 27, the transmitted/received information memory 35, and the entering speed table 55. Alternatively, an FPGA may be provided instead of the microprocessor 88. Moreover, another storage medium such as a hard disk or a flash memory may be provided instead of the memory 70.

Figure 7:
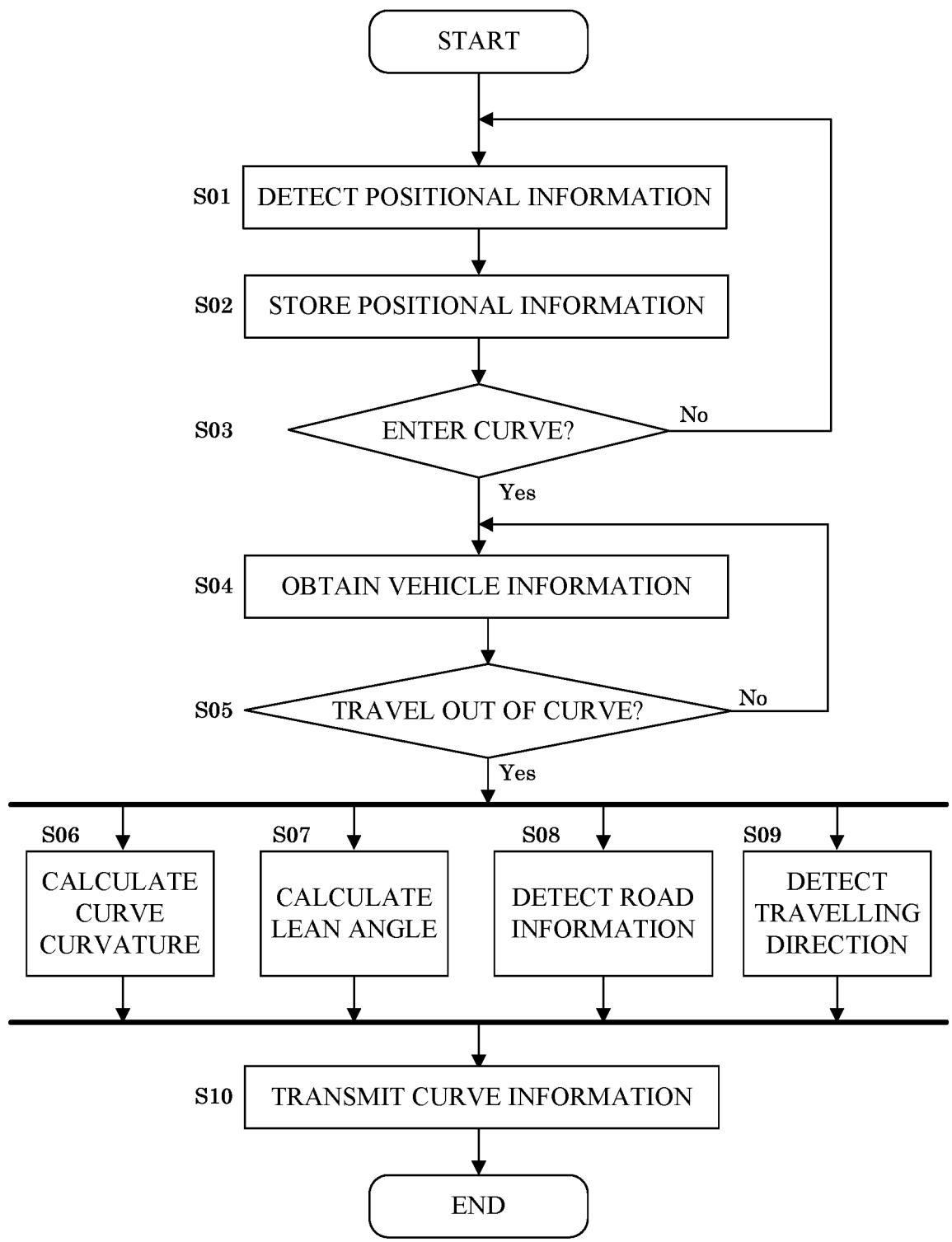
FIGS. 7 and 8 each illustrate a flow chart of a driving assist procedure according to the first preferred embodiment of the present invention.
Figure 8:
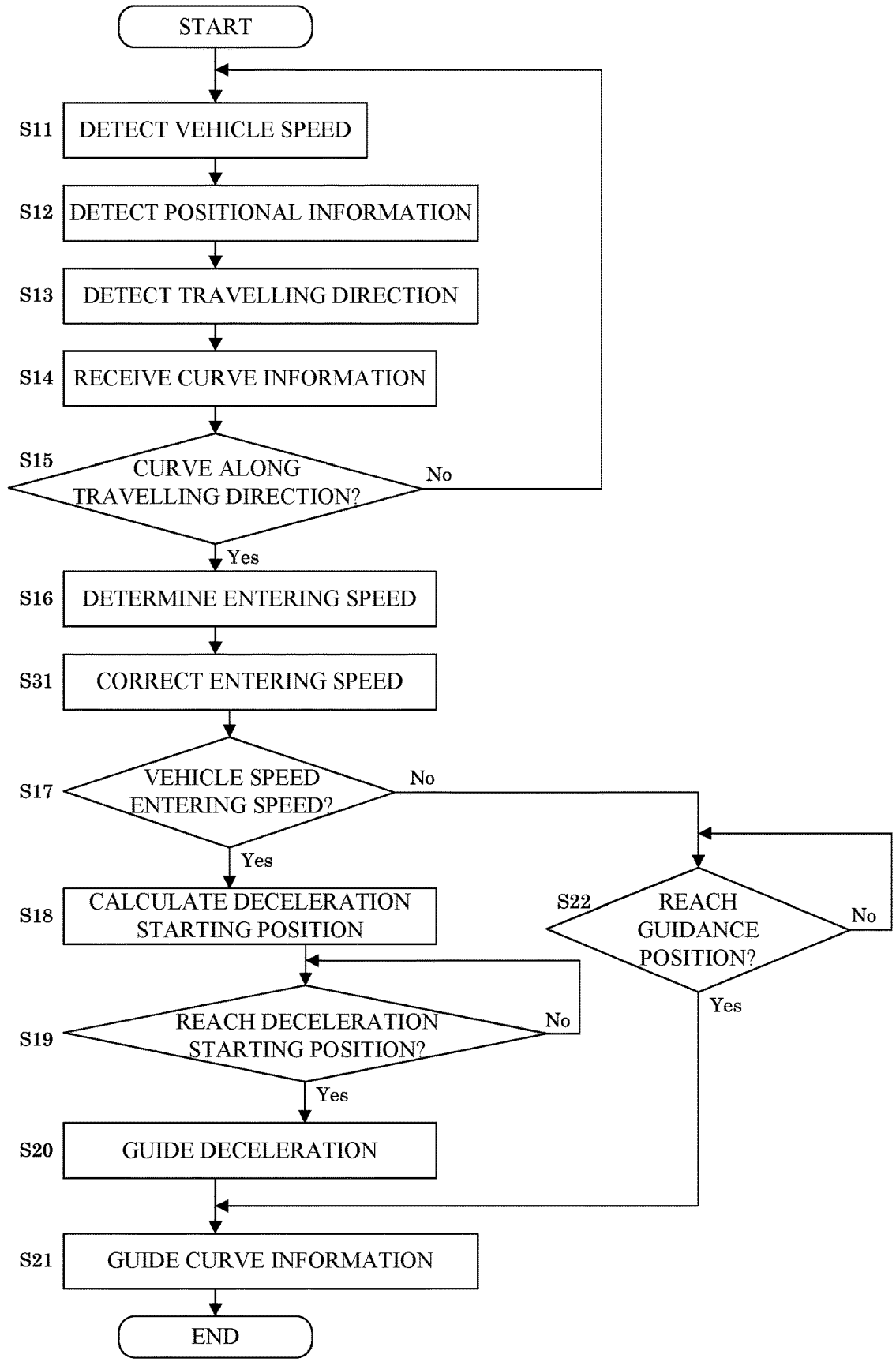

The following describes a procedure for providing driving assistance with reference to FIGS. 7 and 8. FIG. 7 is a flow chart illustrating a procedure for providing driving assistance including transmitting the curve information. FIG. 8 is a flow chart illustrating a procedure for providing driving assistance including receiving the curve information.

The following firstly describes a procedure for providing driving assistance for the first vehicle 2 that transmits the curve information with reference to FIG. 7. If a driver turns ON the power (main switch) of the first vehicle 2, the GNSS 25 detects a current position of the first vehicle 2 (Step S01). The traveling history memory 27 stores the detected positional information (Step S02). The traveling history memory 27 also stores the attitude angle information detected with the attitude angle sensor 21 and the vehicle speed detected with the vehicle speed sensor 23. Then, the curve detector 31 determines whether or not the first vehicle 2 enters the curve during its traveling. If the curve detector 31 does not detect the curve starting position Cs of the first vehicle 2 (NO in Step S03), the positional information of the first vehicle 2 is continuously detected and stored. If the curve detector 31 detects the curve starting position Cs of the first vehicle 2 (Yes in Step S03), the curve information generator 33 obtains the vehicle information, such as the attitude angle information, the vehicle speed, the positional information stored in the traveling history memory 27, and the image captured by the image sensor 29 (Step S04).

Then, the curve detector 31 determines whether or not the first vehicle 2 travels out of the curve (Step S05). If the curve detector 31 does not detect the curve terminal position Cf of the first vehicle 2 (No in Step S05), the vehicle information of the first vehicle 2 such as the attitude angle information, the vehicle speed, the positional information, and the image captured by the image sensor 29 is continuously obtained. If the curve detector 31 detects the curve terminal position Cf of the first vehicle 2 (Yes in Step S05), curve information on the curve where the first vehicle 2 has traveled is generated. Then the curvature calculator 41 calculates a curvature of the curve of the curve where the first vehicle 2 has traveled (Step S06). Moreover, the lean angle calculator 43 calculates a lean angle of the first vehicle 2 that has traveled along the curve (Step S07). This detects the maximum lean angle of the first vehicle 2 at the curve. Moreover, the road condition calculator 45 determines a road condition of the curve where the first vehicle 2 has traveled to detect road information (Step S08). Furthermore, the traveling direction detector 37 detects a traveling direction of the first vehicle 2 that has traveled along the curve (Step S09). Here, the traveling direction is periodically detected a plurality of times and an average of the detected values is calculated, such that the traveling direction of the first vehicle 2 that transmits the curve information is detected with enhanced reliability. The steps S06 to S09 are performed concurrently. The communicator 39 transmits the curvature of the curve of the road and the road condition as well as the maximum lean angle and the traveling direction of the first vehicle 2 as the curve information from the first vehicle 2 that has traveled along the curve to the surroundings (Step S10).

The following describes a procedure for providing driving assistance for the second vehicle 2' that receives the curve information with reference to FIG. 8. The vehicle speed sensor 23 detects the vehicle speed of the second vehicle 2' while the second vehicle 2' travels (Step S11). The GNSS 25 detects positional information of the second vehicle 2' (Step S12). The traveling direction detector 37 detects a traveling direction of the second vehicle 2' in accordance with traveling positional information stored in the traveling history memory 27 (Step S13). If the communicator 39 receives the curve information from the first vehicle 2 (Step S14), the transmitted/received information memory 35 stores the received curve information, and the direction calculator 51 and the distance calculator 53 determine whether or not the curve of the received curve information lies along the traveling direction of the receiving vehicle 2' (Step S15). If it is determined that the curve of the received curve information does not lie along the traveling direction of the second vehicle 2' (No in Step S15), the process returns to the step S11 and it is placed in a standby condition to receive next curve information. If it is determined that the curve of the received curve information lies along the traveling direction of the second vehicle 2' (Yes in Step S15), the entering speed calculator 57 determines an entering speed from the curvature of the curve included in the curve information (Step S16). Here, the entering speed corrector 59 corrects the determined entering speed with reference to the road information included in the curve information (Step S31).

It is determined through comparison of the determined or corrected entering speed with a current vehicle speed of the second vehicle 2' whether or not the vehicle speed is larger than the entering speed (Step S17). If the vehicle speed is larger than the entering speed (Yes in Step S17), a distance from the second vehicle 2' to the curve is calculated based on the curve terminal position Cf included in the curve information and the current position of the second vehicle 2'. In addition, a deceleration starting position relative to the curve is calculated from the distance and the current vehicle speed so that the second vehicle 2' enters the curve at the determined entering speed under a suitable deceleration (Step S18). Accordingly, a time of reaching the deceleration starting position corresponds to a timing to provide the curve information.

Since the second vehicle 2' continuously travels toward the curve, it is determined whether or not the second vehicle 2' has reached the deceleration starting position (Step S19). If it is determined that the second vehicle 2' has not reached the deceleration starting position yet (No in Step S19), it is determined again whether or not the second vehicle 2' has reached the deceleration starting position after a given period of time elapses. If it is determined that the second vehicle 2' has reached the deceleration starting position (Yes in Step S19), the monitor 69 displays the curve entering speed and guidance to start deceleration (Step S20). The monitor 69 also displays the curve information (Step S21). Providing the curve information is not limited to the image display but may be provided through voice from the speaker.

Moreover, if it is determined in the step S17 that the vehicle speed is equal to or smaller than the entering speed (No in Step S17), it is determined whether or not the second vehicle 2' has reached a guidance position spaced away from the curve by the predetermined distance (Step S22). Here, a time of reaching the guidance position corresponds to a timing to provide the curve information. If it is determined that the second vehicle 2' has not reached the guidance position yet (No in Step S22), it is determined again whether or not the second vehicle 2' has reached the guidance position after a given period of time elapses. If the second vehicle 2' has reached the guidance position (Yes in Step S22), the monitor 69 displays the curve information (Step S21). The curve information is transmitted from the first vehicle 2 that has traveled along the curve to the second vehicle 2' traveling toward the curve in the above manner, thus providing assistance to the second vehicle 2' that will travel along the curve in the future.

As noted above, with the driving assist apparatus, the driving assist method, and the driving assist system according to the first preferred embodiment, the traveling position of the first vehicle 2 is stored, and the curve where the first vehicle 2 has traveled is detected. The curve information including the curvature of the detected curve is transmitted to the surroundings after the vehicle passes the curve. This provides driving assistance to the second vehicle 2' that approaches a target curve during traveling.

Information exchange is made between the second vehicle 2' before passing through the curve and the first vehicle 2 opposite thereto after passing through the curve, such that the curve information is received under less influence from electromagnetic waves and the like. Moreover, the second vehicle 2' that receives the curve information determines the curve entering speed in accordance with the curve information including the curvature of the curve. This provides an entering speed suitable for the curve to the driver, thus providing driving assistance for the curve. Moreover, the timing to provide the curve information is determined in response to the speed of the second vehicle 2' that will travel along the curve. This allows the driver to confirm the curve information at a suitable timing before the vehicle enters the curve. Consequently, curve information about a curve along which the vehicle travels for the first time is also confirmed before the vehicle enters the curve, thus reducing the driver's stress.

Moreover, the curve entering speed is corrected in accordance with the road information, such that an optimal curve entering speed is displayed to the driver depending on the road conditions. Road conditions are typically only detected by the driver's own vehicle at a distance close to the vehicle, and thus are often insufficient information for the driver. Here, the road information is obtained from other vehicles, thus providing the information at a suitable timing.

Moreover, if the speed of the driver's own vehicle is larger than the curve entering speed, the deceleration position is calculated and a deceleration instruction is provided when the vehicle has reached the deceleration position. This prevents rapid braking immediately before the curve, leading to deceleration to an optimal speed with no difficulty before the vehicle enters the curve. In addition, it is determined whether or not the driver's own vehicle travels along the curve corresponding to the received curve information. This prevents providing unnecessary curve information, reducing the driver's stress related to the relevance of the information.

Second Preferred Embodiment

Figure 9:
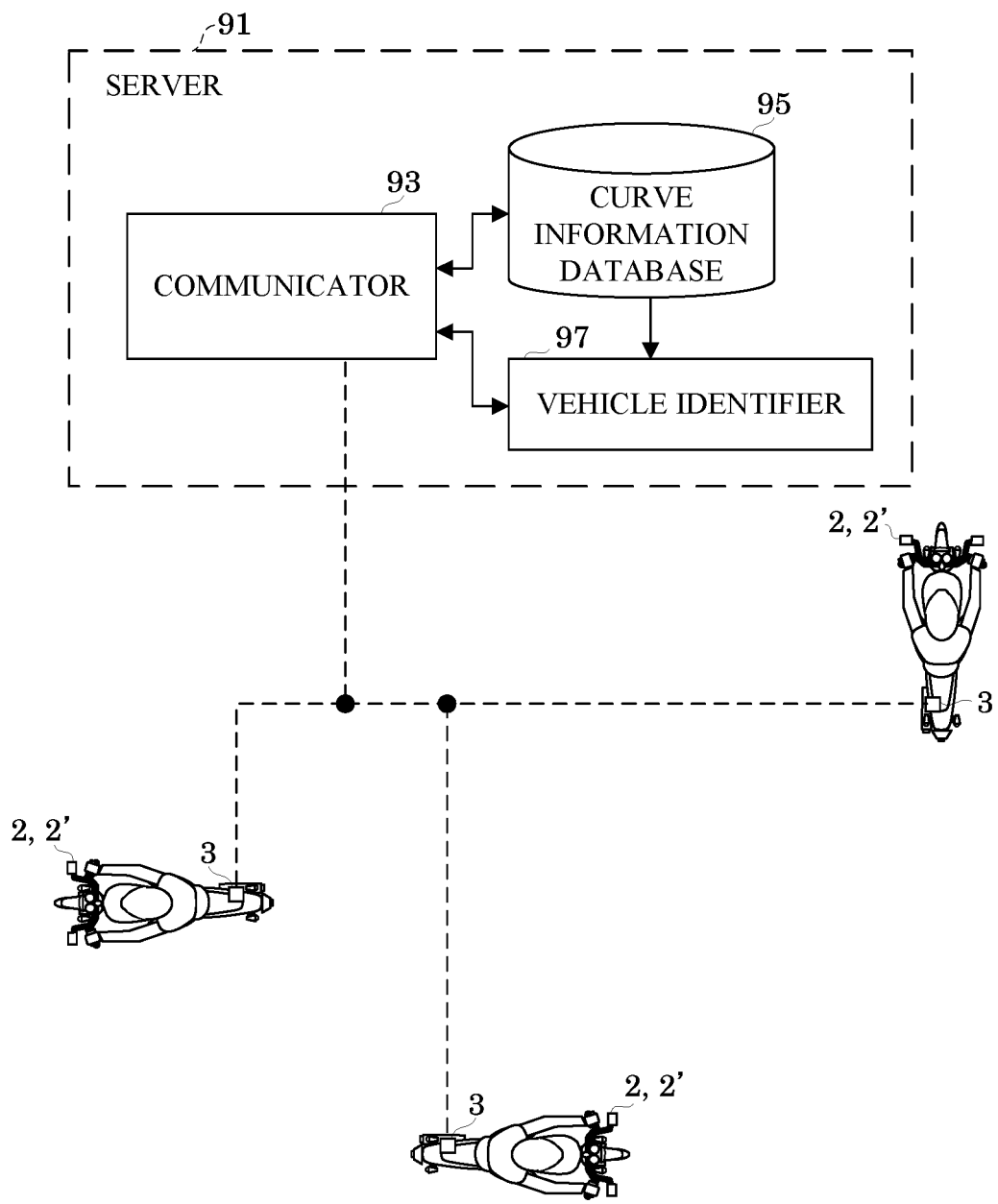
FIG. 9 illustrates an outline configuration of a driving assist system according to a second preferred embodiment of the present invention.

The following describes a driving assist system according to a second preferred embodiment of the present invention with reference to FIG. 9. The second preferred embodiment provides a driving assist system including the driving assist apparatus of the first preferred embodiment and a server that is accessed by the driving assist apparatus.

FIG. 9 is a block diagram illustrating the driving assist system of the second preferred embodiment. In FIG. 9, since the elements with the same reference numerals as in the first preferred embodiment each have the same configuration as in the first preferred embodiment, description thereof is to be omitted. In the first preferred embodiment, the curve information is transmitted/received among the vehicles through vehicle-to-vehicle communication. In contrast to this, in the second preferred embodiment, curve information is transmitted to the server and stored, and the curve information is transmitted from the server to a vehicle that approaches a target curve in accordance with the curve information stored in the server using a road-vehicle communication network or a cellular telephone communication network. Consequently, a configuration of the driving assist apparatus and a configuration of the vehicle other than the following are the same as that of the first preferred embodiment.

A server 91 includes a communicator 93, a curve information database 95, and a vehicle identifier 97. The curve information database 95 includes, for example, a hard disk and the like, and the vehicle identifier 97 includes, for example, a CPU.

The communicator 93 transmits/receives the curve information to/from the communicator 39 of each of the first vehicles 2 and the second vehicles 2'. The curve information of the first vehicles 2 and positional information of the first vehicles 2 and the second vehicles 2' are received from each of the first vehicles 2 and the second vehicles 2', and the curve information is transmitted to the communicator 39 of the second vehicle 2' identified by the vehicle identifier 97. The curve information may directly be transmitted/received between the server 91 and each of the first vehicles 2 and the second vehicles 2' through, for example, radio communication. Alternatively, the curve information may be transmitted/received via a roadside communicator using an internet line.

The curve information database 95 stores the curve information received from each of the first vehicles 2 in association with a time of traveling along a curve.

The vehicle identifier 97 identifies the second vehicle 2 that approaches the curve terminal position Cf included in the curve information within a time after a predetermined time elapses when the curve information is stored in the curve information database 95 using the positional information of each of the second vehicles 2'. The vehicle identifier 91 functions in the same manner as the direction calculator 51 and the distance calculator 53 in the first preferred embodiment, and accordingly identifies the second vehicle 2' that approaches the curve in the same method as in the first preferred embodiment. When the second vehicle 2' that approaches the curve is identified, the server 91 transmits the corresponding curve information from the communicator 93 to the driving assist apparatus 3 of the second vehicle 2'.

As noted above, with the driving assist system in the second preferred embodiment, using the server 91 allows the other vehicles to receive the curve information even when there is a time interval between when the one vehicle that has traveled along curve transmits the curve information and the other vehicle travels along the curve. The server 91 also obtains the positional information of each of the vehicles. Accordingly, a vehicle that travels toward the curve in response to the stored curve information is able to be identified. Consequently, the server 91 is able to transmit the curve information to the vehicle.

The present invention is not limited to the preferred embodiments described above, but may be modified as described below and in many other ways.

In the above-described preferred embodiments, a two-wheeled motor vehicle has been described as one example of the leaning type vehicle. However, this is not limiting. The vehicle may be a leaning type three-wheeled vehicle or four-wheeled vehicle.

In the above-described preferred embodiments, the road condition is preferably detected through image processing. However, this is not limiting. That is, the road condition may be determined through, for example, light reflectance to detect whether the road is dry, wet, or snowy.

In the above-described preferred embodiments, a timing to provide the curve information is preferably determined in accordance with the vehicle speed. However, this is not limiting. That is, a time when the vehicle reaches a position spaced away from the curve terminal position Cf by a predetermined distance may be determined as the timing to provide the curve information. For instance, a time when the second vehicle 2' reaches a position within a radius distance shorter than any radius distance Ro whose center is the curve terminal position Cf may be determined as the timing to provide the curve information. Moreover, the predetermined distance is variable depending on the vehicle speed. For instance, the predetermined distance may be larger as the vehicle speed increases.

In the above-described preferred embodiments, the road condition calculator 45 determines whether the road is, dry, wet, or snowy. However, this is not limiting. A friction coefficient μ of the road may be detected, and the value μ may be used as the road information. Here, the entering speed corrector 59 may correct the entering speed depending on the value μ.

In the above-described preferred embodiments, the curve information preferably includes the curvature of the curve of the road and the road condition, the maximum lean angle and the traveling direction of the first vehicle 2, and the curve terminal position Cf. However, this is not limiting. The curve information may include a shape of the curve in the road and an actual traveling speed of the first vehicle 2. Moreover, the monitor 69 displays at least one piece of the curve information. Furthermore, the driver may optionally select the curve information to be displayed.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A driving assist method comprising:
   detecting positional information of multiple positions of a first vehicle with a global navigation satellite system;
   storing the detected positional information;
   detecting a curve along which the first vehicle has already traveled in accordance with the multiple positions included in the stored positional information;
   generating curve information including road information and a curvature of the curve at the detected curve;
   transmitting the generated curve information from the first vehicle to surroundings of the first vehicle after the first vehicle passes the curve;
   receiving the curve information by a second vehicle;
   determining a timing to provide the curve information in accordance with the received curve information;
   providing the curve information at the determined timing to the second vehicle; and
   evaluating whether or not the second vehicle travels along the curve in response to the received curve information, and the preventing providing the curve information to the second vehicle when the second vehicle is not traveling along the curve.

2. The driving assist method according to claim 1, further comprising:
   determining a curve entering speed in accordance with the curvature of the curve included in the curve information; wherein
   the determining the timing determines the timing in accordance with the curve information and the speed of the second vehicle, and the providing the curve information provides the curve entering speed in accordance with the timing.

3. The driving assist method according to claim 2, further comprising:
   comparing a speed of the second vehicle with the curve entering speed; and
   calculating a deceleration starting position in accordance with a position of the second vehicle and the curve information when the speed of the second vehicle is larger than the curve entering speed; wherein
   the providing the curve information includes providing deceleration instructing information when the second vehicle reaches the deceleration starting position.

4. The driving assist method according to claim 2, further comprising:
   correcting the determined curve entering speed in accordance with the road information included in the curve information.

5. A vehicle driving assist apparatus comprising:
   a positional information detector that detects positional information of multiple positions of a transmitting vehicle;
   a positional information storage that stores the detected positional information;
   a curve detector that detects a curve along which the transmitting vehicle has already traveled in accordance with the multiple positions included in the stored positional information;
   a curve information generator that generates curve information on the detected curve, the curve information including road information and a curvature of the curve;
   a transmitter that transmits the generated curve information;
   an entering speed calculator that determines a curve entering speed in accordance with the curvature of the curve included in the curve information; and
   a speed comparator that compares a speed of a receiving vehicle with the curve entering speed; wherein
   the positional information detector includes a global navigation satellite system; and
   when the speed of the receiving vehicle is equal to or smaller than the curve entering speed, the transmitter transmits the curve information at a time when the receiving vehicle reaches a guidance position spaced away from the curve by a predetermined distance.

6. A driving assist system comprising:
   a positional information detector that detects positional information of multiple positions of a transmitting vehicle;
   a positional information storage that stores the detected positional information;
   a curve detector that detects a curve along which the transmitting vehicle has already traveled in accordance with the multiple positions included in the stored positional information;

a curve information generator that generates road information and curve information on the detected curve;
a transmitter that transmits the generated curve information; and
a driving assist apparatus including:
 a receiver that receives curve information including road information and a curvature of a curve;
 a timing calculator that determines a timing to provide the curve information in accordance with the received curve information; and
 an information output that provides the curve information at the determined timing;
a server that stores the transmitted curve information and transmits the stored curve information to the driving assist apparatus on a receiving vehicle; wherein
the positional information detector includes a global navigation satellite system; and
the server is not mounted on either one of the transmitting vehicle and the receiving vehicle.

7. The driving assist system according to claim 6, wherein the server acquires positional information on the transmitting vehicle and the receiving vehicle, and transmits the stored curve information to the driving assist apparatus of the receiving vehicle traveling toward the curve in response to the curve information.

8. The driving assist method according to claim 1, wherein
the step of generating the road information includes determining a road condition through image processing based on an image of a surface of the road in the curve taken by an image sensor; and
the road information includes at least one of:
 first information that indicates whether the road is a paved road or a dirt road;
 second information that indicates whether a condition of the road is a dry condition, a wet condition, or a snowy condition; and
 third information that indicates a friction coefficient of the road.

9. The driving assist method according to claim 2, further comprising:
comparing a speed of the second vehicle with the curve entering speed; wherein
when the speed of the second vehicle is equal to or smaller than the curve entering speed, the step of determining the timing determines to provide the curve information at a time when the second vehicle reaches a guidance position spaced away from the curve by a predetermined distance.

10. The driving assist method according to claim 9, wherein
the guidance position is variable based on the road information included in the curve information.

11. The driving assist method according to claim 4, wherein
when the road information indicates the road is a wet condition or a snowy condition, the correcting the determined curve entering speed decreases the curve entry speed by a greater rate than when the road information indicates the road is a dry condition; and
when the road information indicates the road is a dirt road, the correcting the determined curve entering speed decreases the curve entry speed by a greater rate than when the road information indicates the road is a paved road.

* * * * *